United States Patent
Gentili

(10) Patent No.: US 11,570,022 B2
(45) Date of Patent: Jan. 31, 2023

(54) ELECTRICAL DEVICE THAT ACCESSES A MOBILE TELEPHONY NETWORK IN AN ALTERNATIVE OPERATING MODE

(71) Applicant: SAGEMCOM BROADBAND SAS, Rueil Malmaison (FR)

(72) Inventor: Fabio Gentili, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 222 days.

(21) Appl. No.: 16/720,709

(22) Filed: Dec. 19, 2019

(65) Prior Publication Data
US 2020/0204403 A1 Jun. 25, 2020

(30) Foreign Application Priority Data

Dec. 20, 2018 (FR) ...................................... 18 73682

(51) Int. Cl.
| | | |
|---|---|---|
| H04L 12/66 | (2006.01) | |
| H04L 12/28 | (2006.01) | |
| H04W 8/18 | (2009.01) | |
| H04W 84/04 | (2009.01) | |
| H04W 36/24 | (2009.01) | |
| H04W 36/16 | (2009.01) | |
| H04W 36/34 | (2009.01) | |

(52) U.S. Cl.
CPC .......... *H04L 12/66* (2013.01); *H04L 12/2856* (2013.01); *H04W 8/183* (2013.01); (Continued)

(58) Field of Classification Search
CPC ......... H04L 12/00; H04L 12/66; H04L 12/02; H04L 12/2856; H04L 47/58; (Continued)

(56) References Cited

U.S. PATENT DOCUMENTS 8,478,340 B1 * 7/2013 Deloatch .............. G06K 7/0095
455/411
2002/0087868 A1 7/2002 King et al.
(Continued)

FOREIGN PATENT DOCUMENTS

| CN | 106603354 A | 4/2017 | |
| JP | 2002319892 | * 10/2002 | ............... H04B 7/26 |

(Continued)

OTHER PUBLICATIONS

Leymann et al., "GRE Tunnel Bonding" Oct. 9, 2015, pp. 1-39.

*Primary Examiner* — Warner Wong
(74) *Attorney, Agent, or Firm* — Muncy, Geissler, Olds & Lowe, P.C.

(57) ABSTRACT

Electrical device designed to operate in an alternative operating mode in which the electrical device accesses a mobile telephony network (2), the electrical device having a central processing component (3) designed to manage the operation of the electrical device, a reception device (15) for receiving a SIM card (16), a presence detector (17) for detecting the presence of the SIM card, and a communication module (6) dedicated to communications with the mobile telephony network and linked to the reception device (15), the electrical device being characterized in that the central processing component (3) comprises a detection input (22) linked to the presence detector (17), such that the central processing component (3) is designed to determine whether or not the SIM card (16) is positioned in the reception device (15) without activating the communication module (6).

10 Claims, 2 Drawing Sheets

(52) U.S. Cl.
CPC ............ *H04W 36/16* (2013.01); *H04W 36/24* (2013.01); *H04W 36/34* (2013.01); *H04W 84/042* (2013.01)

(58) Field of Classification Search
CPC .. H04L 65/102; H04W 84/02; H04W 84/042; H04W 8/183; H04W 8/20; H04W 36/00; H04W 36/12; H04W 36/16; H04W 36/24; H04W 36/34
See application file for complete search history.

(56) References Cited

U.S. PATENT DOCUMENTS

| | | | | |
|---|---|---|---|---|
| 2004/0192251 A1* | 9/2004 | Zhao | ..................... | H04W 76/50 455/435.1 |
| 2006/0030290 A1* | 2/2006 | Rudolf | ................... | H04W 4/90 455/404.1 |
| 2008/0214240 A1* | 9/2008 | Choi | ..................... | H04W 76/50 370/352 |
| 2010/0029247 A1* | 2/2010 | De Atley | ............. | H04B 1/3816 455/411 |
| 2012/0083316 A1* | 4/2012 | Lee | ...................... | G06K 7/0069 455/558 |
| 2015/0237457 A1* | 8/2015 | Yu | ........................... | H04W 4/60 455/558 |
| 2016/0344862 A1* | 11/2016 | Tucker | ................ | H04W 12/082 |
| 2018/0352421 A1* | 12/2018 | Chen | ....................... | H04W 4/60 |
| 2019/0149985 A1* | 5/2019 | Breuer | ............. | H04W 52/0209 726/6 |
| 2020/0221288 A1* | 7/2020 | Du | ........................ | H04W 8/183 |

FOREIGN PATENT DOCUMENTS

| | | | | |
|---|---|---|---|---|
| WO | WO 03021992 | * | 3/2003 | .............. H04Q 7/32 |
| WO | WO2010133051 A1 | | 11/2010 | |

* cited by examiner

[Fig. 1]
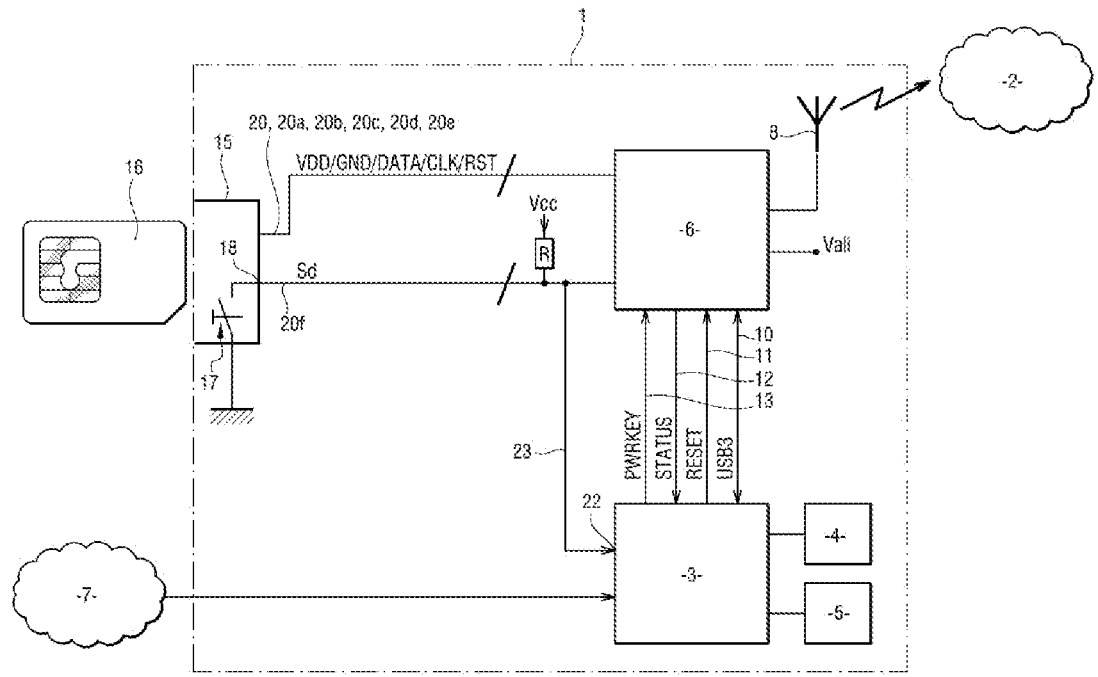
[Fig. 2]
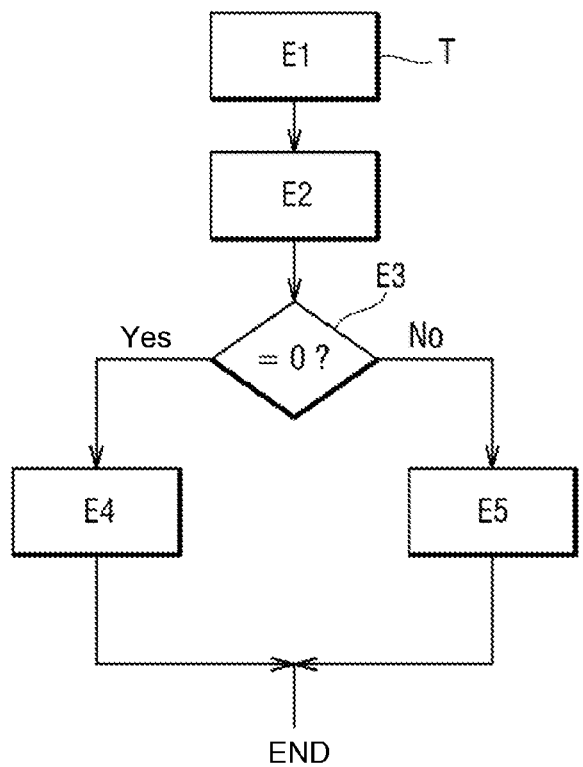

[Fig. 3]
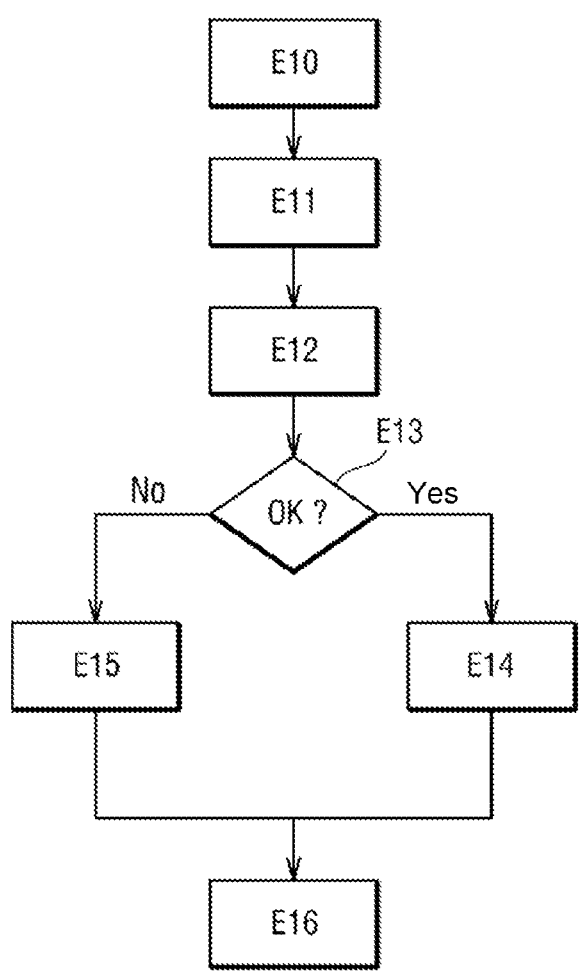

ELECTRICAL DEVICE THAT ACCESSES A MOBILE TELEPHONY NETWORK IN AN ALTERNATIVE OPERATING MODE

The invention relates to the field of electrical devices that access a mobile telephony network in an alternative operating mode.

BACKGROUND OF THE INVENTION

A mobile telephone very conventionally receives a SIM (for Subscriber Identity Module) card intended to identify the user of the mobile telephone in a mobile telephony network. The mobile telephone thus adapts its usage to the conditions to which the user subscribes with the operator in charge of the mobile telephony network. The mobile telephone is intended to access the mobile telephony network when it is in a nominal operating mode.

Some electrical devices are intended to access a mobile telephony network not when they are operating in a nominal operating mode but only when they are operating in an alternative operating mode that is different from the nominal operating mode.

Home gateways that are equipped with a dual WAN/xDSL (WAN for worldwide area network and DSL for digital subscriber line) and 4G communication interface are thus known. In some of these home gateways, the communication functionality with the 4G mobile telephony network is used intermittently and temporarily to compensate for a failure of the xDSL network. The mobile telephony network is then used so as to allow the home gateway to access the Internet through the data link supported by the mobile telephony network.

Such a home gateway therefore operates in a nominal operating mode in which the home gateway accesses the xDSL network and does not access the mobile telephony network, and in an alternative or backup operating mode in which the home gateway accesses the mobile telephony network.

This home gateway conventionally has a central processor that manages the operation of the home gateway, a communication module dedicated to communications with the mobile telephony network and, of course, a reception device for receiving a SIM card and a presence detector for detecting the presence of the SIM card in the reception device. The central processor in particular activates and deactivates the communication module when necessary.

OBJECT OF THE INVENTION

The object of the invention is to significantly reduce the electricity consumption of an electrical device that accesses a mobile telephony network in an alternative operating mode.

SUMMARY OF THE INVENTION

In order to achieve this aim, what is proposed is an electrical device designed to operate in a nominal operating mode in which the electrical device does not access a mobile telephony network, and in an alternative operating mode in which the electrical device accesses the mobile telephony network, the electrical device having a central processing component designed to manage the operation of the electrical device, a reception device for receiving a SIM card, a presence detector for detecting the presence of the SIM card in the reception device, and a communication module dedicated to communications with the mobile telephony network and linked to the reception device, the central processing component being designed in particular to activate and deactivate the communication module, the electrical device being characterized in that the central processing component comprises a detection input linked to an output of the presence detector, such that the central processing component is designed to determine whether or not the SIM card is positioned in the reception device without activating the communication module.

The electrical device (for example a home gateway) therefore comprises a central processing component (for example a processor) that manages the operation of the electrical device and that in particular activates the communication module when it is necessary to use same.

The central processing component thus activates the communication module when the electrical device is in conditions that require the alternative operating mode to be implemented. In order to ensure that the alternative operating mode is actually available, it is necessary to regularly check that a SIM card is actually present in the electrical device.

In a conventional electrical device from the prior art, only the communication module is linked to the presence detector for detecting the presence of the SIM card in the reception device, such that, in order to check that the SIM card is actually present, the central processing component has to regularly activate the communication module.

The central processing component of the electrical device according to the invention is for its part linked directly to the presence detector, such that the central processing component is able to determine whether or not a SIM card is present without activating the communication module, and therefore without said communication module being supplied with power.

Now, the electricity consumption of the communication module is relatively high. The electrical device according to the invention, in which the communication module does not need to be activated in order to determine whether or not the SIM card is present, therefore exhibits considerably lower electricity consumption in comparison with an electrical device from the prior art.

What is additionally proposed is a communication method implemented in a central processing component of the electrical device that has just been described, comprising the steps of:
  acquiring a detection signal on the detection input of the central processing component;
  determining, from the detection signal, whether or not the SIM card is present in the reception device;
  if the SIM card is absent, producing a first alert message intended for the user.

What is furthermore proposed is a computer program comprising instructions for a central processing component of an electrical device to implement the communication method that has just been described.

What are also proposed are storage means, characterized in that they store a computer program comprising instructions for a central processing component of an electrical device to implement the communication method that has just been described.

The invention will be better understood in the light of the following description of one particular nonlimiting mode of implementation of the invention.

BRIEF DESCRIPTION OF THE DRAWINGS

Reference will be made to the appended drawings, in which:

FIG. 1 shows a diagram of an electrical device according to the invention;

FIG. 2 shows detection steps of a communication method implemented by the electrical device according to the invention;

FIG. 3 shows checking steps of the communication method.

DETAILED DESCRIPTION OF THE INVENTION

With reference to FIG. 1, the invention is implemented in this case in a home gateway 1.

The home gateway 1 may operate in a nominal operating mode in which the home gateway 1 does not access a mobile telephony network 2, and in an alternative operating mode in which the home gateway 1 accesses the mobile telephony network 2.

In the nominal operating mode, the home gateway 1 is linked to the Internet 7 via a WAN/xDSL interface. In the alternative operating mode, the home gateway 1 is linked to the mobile telephony network 2, which is for example a 4G, 5G, LTE, etc. network.

The alternative operating mode is a backup mode adopted by the home gateway 1 when the connection to the Internet 7 via the WAN/xDSL interface is defective. "Defective" is understood to mean that the connection is completely interrupted, disconnected, or else does not have a good enough performance to allow the home gateway 1 to operate optimally. Thus, in the alternative operating mode, the mobile telephony network 2 is used to compensate for a total failure of the connection to the Internet 7 via the WAN/xDSL interface, but also to improve the operation of the home gateway 1 by combining the speeds of the Internet 7 via the WAN/xDSL interface and of the mobile telephony network 2.

The alternative operating mode is used temporarily and intermittently, typically a few times per month, for a few hours at a time.

The home gateway 1 has a central processing component 3 designed to manage the operation of the home gateway 1. "Manage the operation" is understood to mean that the central processing component 3 is not dedicated to just one function, but is responsible for managing all or a plurality of different subsystems of the home gateway 1, each different subsystem being dedicated to one or more different functions.

The central processing component 3 is for example an SoC (for System on a Chip), referenced BCM63138 and manufactured by Broadcom. The SoC incorporates a processor and is responsible for implementing all of the functionalities of the home gateway 1, including accessing the Internet via the WAN/xDSL interface. To this end, it executes instructions stored in a memory 5 of the NAND FLASH memory type in a random access memory space 4 of the DDR type. The central processing component 3 is designed to execute instructions of a program in order to implement the communication method that will be described further below.

The home gateway 1 also has a communication module 6 dedicated to communications with the mobile telephony network 2.

The communication module 6 is for example an integrated module referenced Quectel EG06 and manufactured by Quectel.

The communication module 6 is connected to an antenna 8 of the home gateway 1 in order to transmit and receive data using the mobile telephony network 2.

The communication module 6 is supplied with power by a shared power source Vali of the home gateway 1, which is also used to supply power to other subsystems of the home gateway 1.

The central processing component 3 and the communication module 6 are linked to one another by four conductors 10, 11, 12, 13.

The conductor 10 forms the physical support for a communication bus of the USB3 type for exchanging data and commands between the central processing component 3 and the communication module 6 (in both directions).

The central processing component 3 is able to send a RESET signal to the communication module 6 on the conductor 11, which allows the central processing component 3 to reset the communication module 6 in the event of a problem.

The communication module 6 transmits a STATUS signal on the conductor 12, allowing the central processing component 3 to ascertain the availability of the communication module 6 to process information.

The central processing component 3 transmits a PWR-KEY signal on the conductor 13, allowing the central processing component 3 to control the turning-on and turning-off of the communication module 6.

The communication module 6 is thus continuously supplied with power by the shared power source Vali of the home gateway 1, and the central processing component 3 is able to activate or deactivate the communication module 6 using the PWRKEY signal.

It is noted that, as an alternative, the power supply of the communication module 6 could be a specific power source, dedicated to the communication module 6 and driven by the central processing component 3. The central processing component 3 would then activate and deactivate the communication module 6 by driving the specific power source. A combination of the two solutions (specific power source and PWRKEY signal) may also be contemplated.

The home gateway 1 also has a reception device 15 for receiving a SIM card 16. The SIM card 16 of the user is in this case in accordance with the 3GPP TS 21.111 standard. The reception device 15 comprises a specific base into which the SIM card 16 needs to be inserted.

The reception device 15 comprises a presence detector 17 for detecting the presence of the SIM card 16 in the reception device 15. The presence detector 17 is in this case a contactor that produces a detection signal Sd, which is a logic signal, on its output 18. When the presence detector 17 detects the absence of the SIM card 16, the detection signal Sd is at a logic level equal to 1 (high level). When the presence detector 17 detects the presence of the SIM card 16 in the reception device 15, the detection signal Sd is at a logic level equal to 0 (low state).

A pull-up resistor R is linked to the output 18 of the presence detector 17. The resistor R has a resistance of 10 kΩ. The resistor R has a first terminal to which a supply voltage Vcc is applied and a second terminal linked to the output 18.

The reception device 15 comprises a specific base linked to the communication module 6 by six conductors 20 to which normalized signals are applied.

A power supply signal VDD for supplying power to the SIM card 16 is applied to the conductor 20a. A ground signal GND is applied to the conductor 20b. A reset signal RST for resetting the SIM card may be transmitted on the conductor 20c by the communication module 6. DATA signals may be exchanged on the conductor 20d in a bidirectional exchange of data between the SIM card 16 and the communication module 6. CLK signals forming a data synchronization clock are transmitted on the conductor 20e by the communication module 6.

The output 18 of the presence detector 17 for detecting the presence of the SIM card 16 is linked to the communication module 6 via the conductor 20f. The communication module 6 thus receives the detection signal Sd.

Thus, when the central processing component 3 decides that the home gateway 1 should operate in the alternative operating mode, and therefore when the central processing component 3 wishes to activate the communication functionality with the mobile telephony network 2, the central processing component 3 generates a pulse on the conductor 13 (PWRKEY signal), this having the effect of turning on the communication module 6.

Through the STATUS signal and the USB3 bus, the central processing component 3 establishes a dialogue with the communication module 6, the purpose of which is in particular to determine the mobile telephony network 2 of the operator. This operation may require transmitting security verification information linked to the SIM card 16 (PIN code for example).

Through the STATUS signal and the USB3 bus, the central processing component 3 activates communication with a remote device through the 4G network.

When the home gateway 1 is in the nominal operating mode, it is necessary to regularly check the presence of a SIM card 16 in the reception device 15, so as to check the availability of the alternative operating mode should same become necessary.

To this end, the central processing component 3 comprises a detection input 22 that is linked directly, via the conductor 23, to the output 18 of the presence detector 17.

The central processing component 3 is therefore able to determine whether or not the SIM card 16 is positioned in the reception device 15 without activating the communication module 6: when the detection signal Sd, applied to the detection input 22, is a logic level equal to 1, the central processing component 3 detects the absence of the SIM card 16, and when the detection signal Sd is a logic level equal to 0, the central processing component 3 detects the presence of the SIM card 16.

Thus, with reference to FIG. 2, when the home gateway 1 is in the nominal operating mode, the central processing component 3 acquires the detection signal Sd applied to its detection input 22 (step E1).

The acquisition is performed cyclically in this case, at regular intervals, for example every five seconds. The acquisition times are determined using a timer T.

The acquisition could also be performed in a triggered manner, for example when the detection signal Sd transitions from a level reflecting the absence to a level reflecting the presence of the SIM card 16, or vice versa (reference is then made to detection by interruption).

The central processing component 3 reads the detection signal Sd (step E2) and evaluates whether the detection signal Sd is equal to 0 or to 1 (step E3).

If the detection signal Sd is equal to 0, the central processing component 3 deduces from this that the SIM card 16 is present in the reception device 15 (step E4).

If the detection signal is a logic level equal to 1, the central processing component 3 deduces from this that the SIM card 16 is absent, and therefore that the alternative operating mode is not available (step E5). The central processing component 3 then produces a first alert signal intended for a user of the home gateway 1.

The purpose of the first alert signal is to inform the user that the SIM card 16 is absent, that is to say that no SIM card 16 has been inserted into the reception device 15, or else that the SIM card 16 has been removed, and therefore that the alternative operating mode is not available: any future failure of the connection to the Internet via the WAN/xDSL interface will not able to be compensated for by a connection to the mobile telephony network 2.

The first alert signal is for example a visual indication that appears on the home gateway 1 (for example on a screen or an indicator light of the home gateway 1). The first alert signal may also be an audio signal produced by the home gateway 1. The first alert signal may also be generated in the WEB management interface of the home gateway 1. A message of the SMS type or an email may also be sent.

However, detecting the presence of the SIM card 16 does not necessarily mean that it is possible to connect to the mobile telephony network 2, and therefore that the alternative operating mode is available.

Specifically, it would be possible to contemplate a SIM card 16 being inserted into the reception device 15 but the connection to the mobile telephony network 2 not being possible, for example if the SIM card 16 is damaged, or else if the SIM card 16 is unsuitable for the mobile telephony network 2 of the operator supplying the function of the alternative operating mode, or else if the mobile telephony network 2 is unavailable due to a coverage problem, or else for any other reason.

Thus, advantageously, following the steps of detecting the SIM card 16, which steps are visible in FIG. 2, steps of checking the availability of the alternative operating mode, which steps are visible in FIG. 3, are implemented.

The purpose of these checking steps is to check that the link to the mobile telephony network 2 is operational when the central processing component 3 detects that a SIM card 16 has just been inserted into the reception device 15.

To this end, the central processing component 3 attempts to establish a real connection to the mobile telephony network 2.

Thus, with reference to FIG. 3, when the central processing component 3 has detected that a SIM card 16 has just been inserted into the reception device 15 (step E10), the central processing component 3 activates the communication module 6 by turning it on (step E11) in order to make an attempt to connect to the mobile telephony network 2 (step E12).

The central processing component 3 evaluates whether the connection attempt succeeds (step E13).

If the connection attempt succeeds, the central processing component 3 confirms that the alternative operating mode is available (step E14).

If not, the central processing component 3 deduces from this that the alternative operating mode is not available (step E15).

In this case, the central processing component 3 produces a second alert signal intended for the user. The second alert signal may or may not be similar to the first alert signal.

The central processing component 3 then deactivates the communication module 6 by turning it off using the PWRKEY signal (or by disconnecting the specific power source from the communication module 6—step E16).

Inserting a new SIM card 16 leads to the steps that have just been described (detection and checking steps) being implemented again.

It is noted that the steps of checking the availability of the mobile telephony network 2 require only a few seconds of being turned on after detection that the SIM card 16 has been inserted. The communication module 6 is thus actually activated and supplied with power, but for a very brief duration, such that these checking steps require a very low consumption of electric power.

Of course, the invention is not limited to the described embodiment but encompasses all variants that come within the scope of the invention as defined by the claims.

The architecture and the components used in the home gateway may of course be different from those described here. In particular, the central processing component could comprise an FPGA, a microcontroller, etc.

The invention may be implemented in any electrical device able to operate in a nominal operating mode in which the electrical device does not access a mobile telephony network, and in an alternative operating mode in which the electrical device accesses the mobile telephony network. Such an electrical device is for example a communication device integrated into a connected vehicle, a decoder module, a connected speaker, an electricity meter, etc.

The invention claimed is:

1. An electrical device designed to operate in a nominal operating mode in which the electrical device does not access a mobile telephony network, and in an alternative operating mode in which the electrical device accesses the mobile telephony network, the electrical device having a central processing component designed to manage the operation of the electrical device, a reception device for receiving a SIM card, a presence detector for detecting the presence of the SIM card in the reception device, and a communication module dedicated to communications with the mobile telephony network and linked to the reception device, the central processing component being designed in particular to activate and deactivate the communication module, wherein the presence detector transmits a detection signal that indicates whether the SIM card is present in the reception device, the central processing component comprises a detection input directly electrically connected to and receives the detection signal from the presence detector, such that the central processing component is designed to determine based on the detection signal received from the presence detector whether or not the SIM card is positioned in the reception device without activating the communication module, wherein the electrical device is designed to be connected to the Internet via an interface of the WAN/xDSL type when it is in the nominal operating mode, the alternative mode being a backup mode that the electrical device adopts when the connection to the Internet via the interface of the WAN/xDSL type is defective.

2. The electrical device according to claim 1, wherein the central processing component is designed to acquire a detection signal applied to its detection input and, if the detection signal is representative of absence of the SIM card in the reception device, to produce a first alert signal intended for a user of the electrical device.

3. The electrical device according to claim 1, wherein the central processing component is designed, when it detects that a SIM card has just been inserted into the reception device, to activate the communication module in order to make an attempt to connect to the mobile telephony network.

4. The electrical device according to claim 3, wherein the central processing component is designed, if the connection attempt succeeds, to confirm that the alternative operating mode is available.

5. The electrical device according to claim 3, wherein the central processing component is designed, if the connection attempt does not succeed, to produce a second alert signal intended for the user.

6. The electrical device according to claim 1, wherein the electrical device being a home gateway.

7. A communication method implemented in a central processing component of an electrical device according to claim 1, comprising the steps of:
acquiring a detection signal on the detection input of the central processing component;
determining, from the detection signal, whether or not the SIM card is present in the reception device;
if the SIM card is absent, producing a first alert message intended for a user of the electrical device.

8. The communication method according to claim 7, furthermore comprising the steps, when the presence of the SIM card in the reception device has been detected, of:
activating the communication module;
making an attempt to connect to the mobile telephony network;
if the connection attempt succeeds, confirming the availability of the alternative operating mode;
if the connection attempt does not succeed, producing a second alert signal intended for the user;
deactivating the communication module.

9. A computer program comprising instructions for a central processing component of an electrical device to implement a communication method according to claim 7.

10. A non-transitory computer-readable storage medium storing a computer program comprising instructions for a central processing component of an electrical device to implement a communication method according to claim 7.

* * * * *